United States Patent [19]

Clark

[11] 4,169,749
[45] Oct. 2, 1979

[54] METHOD OF MAKING A HOLLOW AIRFOIL

[75] Inventor: Frank B. Clark, Glastonbury, Conn.

[73] Assignee: The United States of America as represented by the Secretary of the Navy, Washington, D.C.

[21] Appl. No.: 835,389

[22] Filed: Sep. 21, 1977

[51] Int. Cl.² ............ B64C 11/24; B32B 17/04; B32B 31/02

[52] U.S. Cl. ............ 156/156; 156/173; 156/189; 156/245; 156/285; 156/293; 264/314

[58] Field of Search ............ 156/156, 173, 189, 285, 156/287, 293, 245; 76/104; 264/94, 271, 314, 316, 320; 416/229 R, 232; 269/22

[56] References Cited

U.S. PATENT DOCUMENTS

| 1,504,547 | 8/1924 | Egerton | 264/314 |
|---|---|---|---|
| 2,202,014 | 5/1940 | Cougheed | 156/189 |
| 2,202,042 | 5/1940 | Blount | 264/314 |
| 3,138,506 | 6/1964 | Ross | 156/156 |
| 3,330,550 | 7/1967 | Brownlee | 156/287 |
| 3,967,996 | 7/1976 | Kamov et al. | 156/156 |
| 3,988,103 | 10/1976 | Hoffmeister | 425/403 |

FOREIGN PATENT DOCUMENTS 732923  3/1943  Fed. Rep. of Germany ........... 264/314

Primary Examiner—Caleb Weston
Attorney, Agent, or Firm—R. S. Sciascia; Paul S. Collignon

[57] ABSTRACT

A method of making hollow aircraft rotor blades from laminated material. An expandable mandrel is first made from curable materials and then a composite build-up of epoxy material is made by layering a plurality of pre-preg plies of curable material over the expandable mandrel. The mandrel and build-up of epoxy materials are then placed in a mold and pressure is applied to expand the mandrel which, in turn, expands the build-up of material against the mold. The mandrel and composite build-up of material are then cured and the mandrel becomes an integral part of the rotor blade.

6 Claims, 3 Drawing Figures

METHOD OF MAKING A HOLLOW AIRFOIL

BACKGROUND OF THE INVENTION

The present invention relates to a method of making hollow articles and more particularly to a method of manufacturing a section of a hollow aircraft rotor blade such as used on a circulation control blade for a helicopter.

In a circulation control rotor (CCR) helicopter, the blades are rigidly fixed to the hub and lift is controlled by controlling the circulation of air around each blade. The primary advantage of a CCR helicopter is the reduction of weight of the entire rotor and reduction in number of moving parts associated with the blades; both of these result from the fact that the lift of each blade is modified by changing the circulation of air around it rather than by changing its angle of attack. The resulting rotor is lighter in weight thereby allowing a greater payload for the craft, and also is more reliable.

Circulation control airfoils utilize jets of air blown tangentially to the upper surface of the trailing edge of the airfoil to generate high lift coefficients. Generally the chordwise position of the blowing slot is determined prior to construction so as to inject the jet at the most beneficial chordwise position. The chordwise position is determined by calculating theoretical pressure distributions for the angles of attack and lift coefficients the airfoil is expected to experience. The jet should be located prior to the aft pressure peak so as to maintain airflow attachment on the airfoil. By increasing the circulation about the airfoil, high lift coefficients can be achieved.

The blades of a circulation control rotor must have an air passageway therethrough and thus are hollow. Many CCR blades are made of metal, such as aluminum, and are manufactured in the following manner. An aluminum alloy ingot is placed into a press chamber and is heated up to the plastic state. The press chamber is provided with a cavity corresponding to the shape of the outer surface of the spar with predetermined allowances for subsequent machining, as well as with a mandrel having a cross-sectional shape corresponding to the cross-sectional shape of the spar cavity. The mandrel and the cavity are disposed relative to each other so that the space defined therebetween corresponds to the spar wall's thickness with an allowance for machining. The blank portions, which are sectioned by the mandrel partitions, are pressed over the inner surface of the spar, whereafter they are welded under pressure and heat during the shaping of the outer surface in the press chamber cavity.

The resulting blank comprises a hollow press shaped piece of a constant cross-sectional shape. In order to obtain a spar from this piece, the latter is subjected to a number of production treatment steps including heat treatment, dressing, machining (milling, grinding, scraping, polishing), as well as twisting about the longitudinal axis, surface hardening application of electrolytic coating. These steps are required to obtain sufficient mechanical properties and dynamic strength, a predetermined aerofoil shape, as well as corrosion resistance.

The above-mentioned production treatment steps require complicated, cumbersome and expensive equipment and a large volume of wastes results from this treatment. In addition, a spar is obtained with a constant cross-sectional shape of the cavity over the entire length thereof and generally it is more desirable to have a variable cross-sectional shape over its length.

One such attempt to provide an improvement over a metal blade having a constant cross-sectional shape of the cavity is shown and described in U.S. Pat. No. 3,967,996, which issued July 6, 1976, to Nikolai Kamov et al. In this patent, a method of manufacturing hollow pieces is described which comprises the steps of forming a blank of single flexible sheets each having a layer of a gluing substance applied thereto, said sheets being placed on a mandrel and subjected to a preliminary compression during which the agglutination of the sheets takes place so as to impart to the blank a stiffness and to shape it into an unclosed profile as required for subsequent steps, bringing the ends of the blank together so as to define a cavity of a closed profile, accommodating an elastic bag in said cavity and placing the blank into a mould having the inner surface corresponding to the outer surface of the piece with subsequent feeding of pressure into the elastic bag for a final pressing during which the hollow piece of a predetermined shape is obtained.

SUMMARY OF THE INVENTION

The present invention relates to a method of making hollow rotor blades by first making an expandable mandrel which later becomes an integral part of the rotor blade. The mandrel is made from curable materials and then a composite build-up of epoxy material is made by layering a plurality of prepreg plies of curable material over the expandable mandrel. The mandrel and build-up of epoxy materials are then placed in a mold and pressure is applied to expand the mandrel which, in turn, expands the build-up of material against the mold. The mandrel and composite build-up of material are then cured and the mandrel becomes an integral part of the rotor blade.

It is therefore a general object of the present invention to provide an improved method for making a hollow rotor blade.

Other objects, advantages and novel features of the invention will become apparent from the following detailed description of the invention when considered in conjunction with the accompanying drawing.

DESCRIPTION OF THE PREFERRED EMBODIMENT

Figure 1:
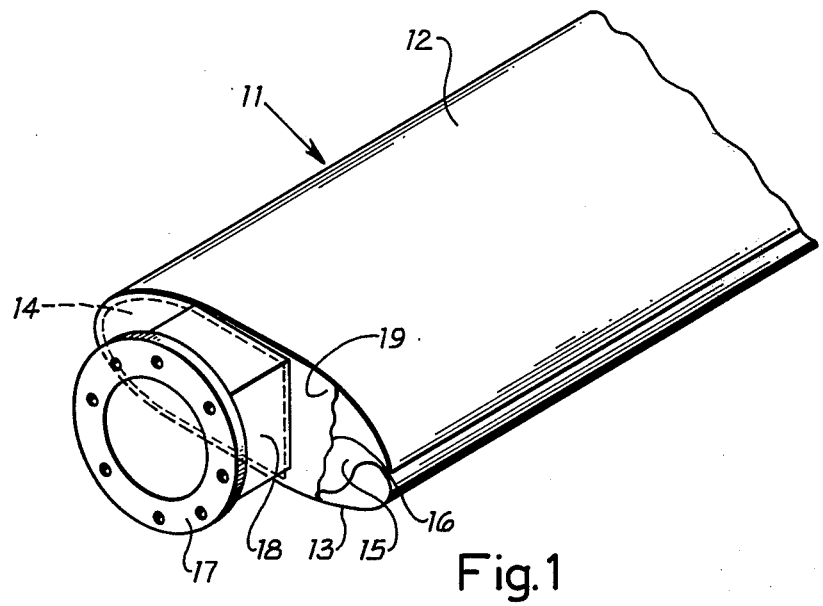
FIG. 1 is a partial view showing a circulation control rotor blade.

Referring now to the drawing, there is shown a blade 11 of a helicopter rotor and the description of the method according to the invention will be made as applied to a portion of blade 11.

Blade 11 has an upper skin 12 and a lower skin 13 that enclose a section 14 and in internal air duct 15. Air from duct 15 is discharged through a slot 16 and the air jet system entrains and mixes with the blade boundary layer air and induces circulation around the entire airfoil. A flange 17 is provided for attaching blade 11 to a rotor hub, and immediately outboard of flange 17 is a rectangular section 18 which is bonded to the blade spar forward channel 19.

Figure 2:
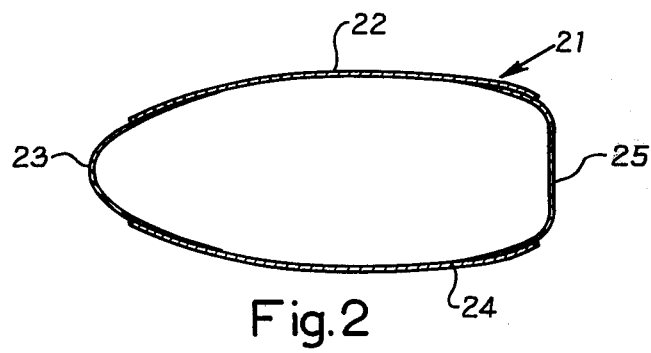
FIG. 2 is a cross-sectional view of an expandable mandrel.

Referring now particularly to FIG. 2 of the drawing, there is shown an expandable composite hollow mandrel 21 for use in forming part of blade 11 and particularly section 14. Hollow mandrel 21 is fabricated from four pieces, namely, upper skin panel 22, leading edge channel 23, lower skin panel 24 and aft channel 25. Parts 22-25 are preferably made from an epoxy laminate "S" (High Strength), glass reinforced material. Pieces 22-25 are assembled by applying a heat curing epoxy adhesive to the faying surfaces. Prior to final cure, this epoxy adhesive permits relative slippage between elements 22-25 so that, upon application of heat and pressure, mandrel 21 might expand by permitting slippage between pieces 22-25. After fabrication, mandrel 21 is partially cured to an advanced "B" stage by heat and pressure.

Figure 3:
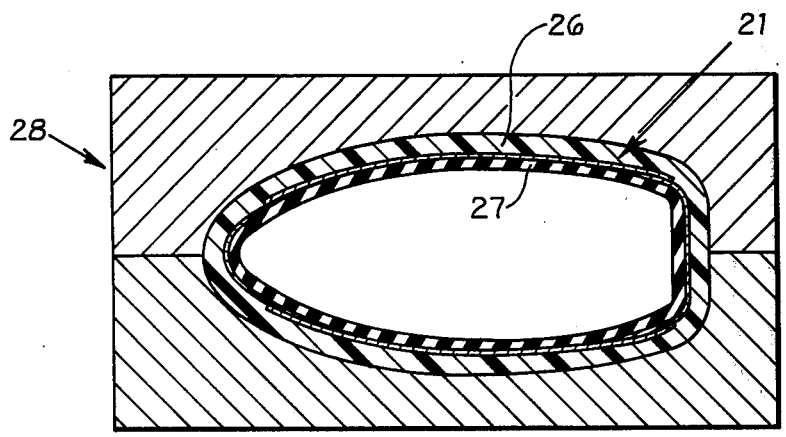
FIG. 3 is a sectional view of a mold.

Referring now to FIG. 3 of the drawing, there is shown a portion of blade 11 being formed. A number of prepreg plies 26 of "S" glass at various orientations are laid-up on the expandable mandrel until the desired build-up is complete. The mandrel 21 and built-up layers are then positioned in a female mold 28 and a pressure diaphragm 27 is inserted into the hollow mandrel 21. Pressure is applied on the inside of diaphragm 27 and the plies 26 are cured at a temperature of 350 degrees F., while pressure is being applied to diaphragm 27.

By way of example, mold 28 might be vacuum bagged so that autoclave pressure will be exerted inside diaphragm 27. It can readily be seen that as mandrel 21 is free to expand, due to the adhesive bond not being fully cured, the pressure exerted by diaphragm 27 will expand mandrel 21 which, in turn, will expand prepreg plies 26 to contact the inner surface of mold 28.

The hollow expandable mandrel 21 can be fabricated from resin reinforced composite materials either partially cured to an advance "B" stage or fully cured to retain a predetermined shape. Also, the expandable mandrel 21 can be fabricated from either woven or unidirectionally oriented material consisting of fiberglass, organic fibers and carbon graphite, or combinations of each. On application of heat and pressure, segments 22, 23, 24, and 25, will expand outwardly by relative slippage between segments, while maintaining uniform pressure to the laminate during the compacting and curing stages. On final cure of the assembly, hollow mandrel 21 becomes an integral part of blade 11.

It can thus be seen that the present invention provides a relatively inexpensive and simple method for manufacturing a hollow rotor blade wherein an expandable mandrel used in manufacturing the blade becomes an integral part of the rotor blade.

Obviously many modifications and variations of the present invention are possible in the light of the above teachings. It is therefore to be understood that the invention may be practiced otherwise than as specifically described.

I claim:
1. A method of making a section of a hollow aircraft rotor blade comprising the steps of:
   forming a hollow expandable mandrel by connecting an upper skin panel, a lower skin panel, a leading edge channel and an aft channel, said panels and channels being of resin reinforced curable materials which are cemented together,
   then laying a plurality of prepreg plies of curable material onto said hollow expandable mandrel to form a composite build-up,
   then placing said hollow expandable mandrel with said plurality of prepreg plies thereon in a female mold,
   then placing a pressure diaphragm inside said hollow mandrel which applies pressure to the inside of said hollow mandrel which, in turn, expands and transmits uniform pressure to said composite build-up,
   then curing said mandrel and build-up whereby said mandrel becomes an integral part of said aircraft rotor blade.
2. A method of making a section of a hollow aircraft rotor blade as set forth in claim 1 wherein said upper skin panel, lower skin panel, leading edge channel and aft channel are cemented with heat curing epoxy adhesive.
3. A method of making a section of a hollow aircraft rotor blade as set forth in claim 1 wherein said upper skin panel, lower skin panel, leading edge channel and aft channel are comprised of epoxy laminate, "S" glass reinforced materials which are partially cured to an advanced "B" stage with heat and pressure.
4. A method of making a section of a hollow aircraft rotor blade as set forth in claim 1 wherein said plurality of prepreg plies of curable material are of epoxy laminate, "S" glass reinforced.
5. A method of making a section of a hollow aircraft rotor blade as set forth in claim 1 wherein said female mold with said composite build-up, said expandable mandrel and said pressure diaphragm therein are vacuum bagged so that autoclave pressure is exerted on said diaphragm.
6. A method of making a section of a hollow aircraft rotor blade as set forth in claim 5 wherein said composite build-up and said expandable mandrel are cured at a temperature of about 350 degrees F. at autoclave pressure.

* * * * *